UNITED STATES PATENT OFFICE.

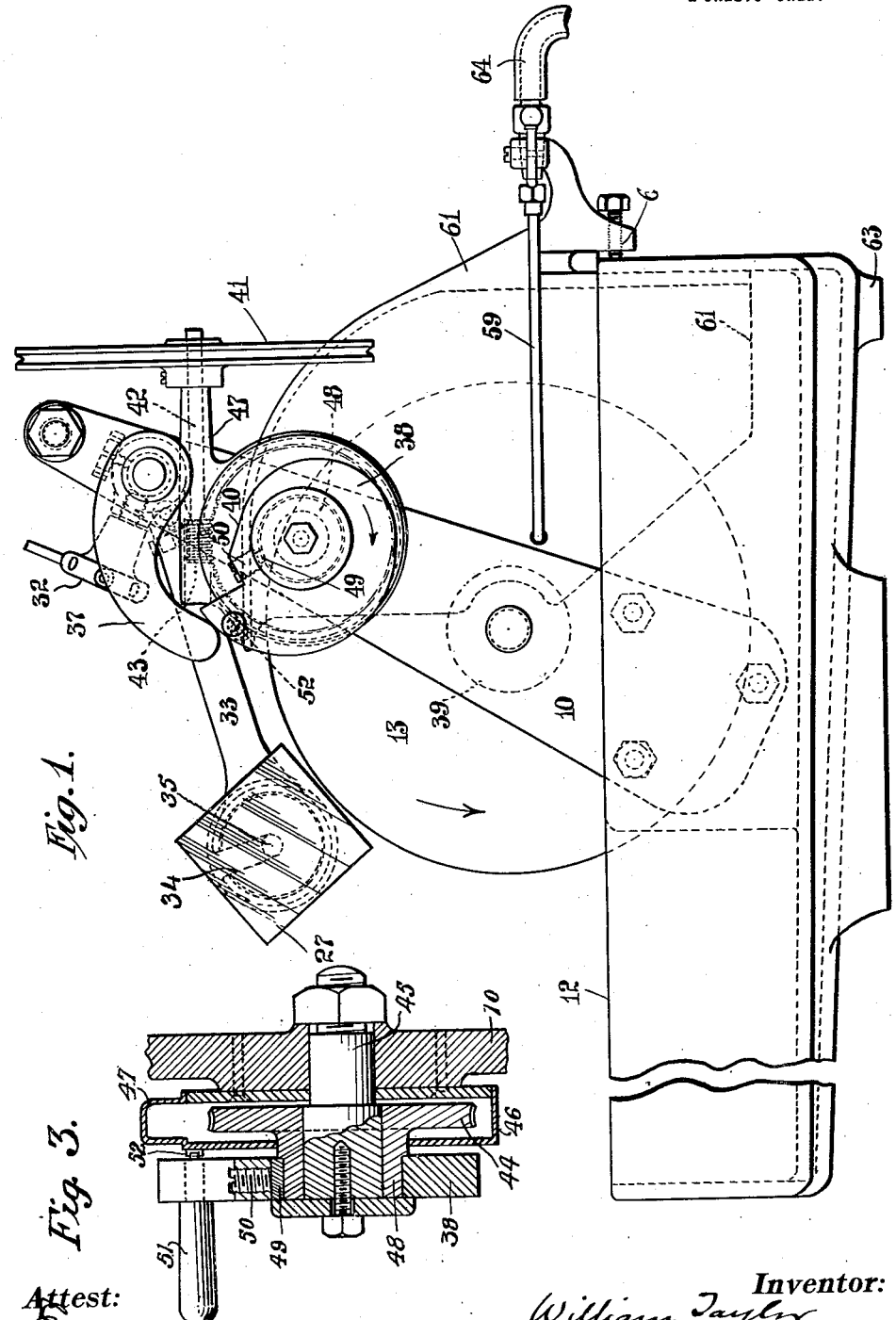

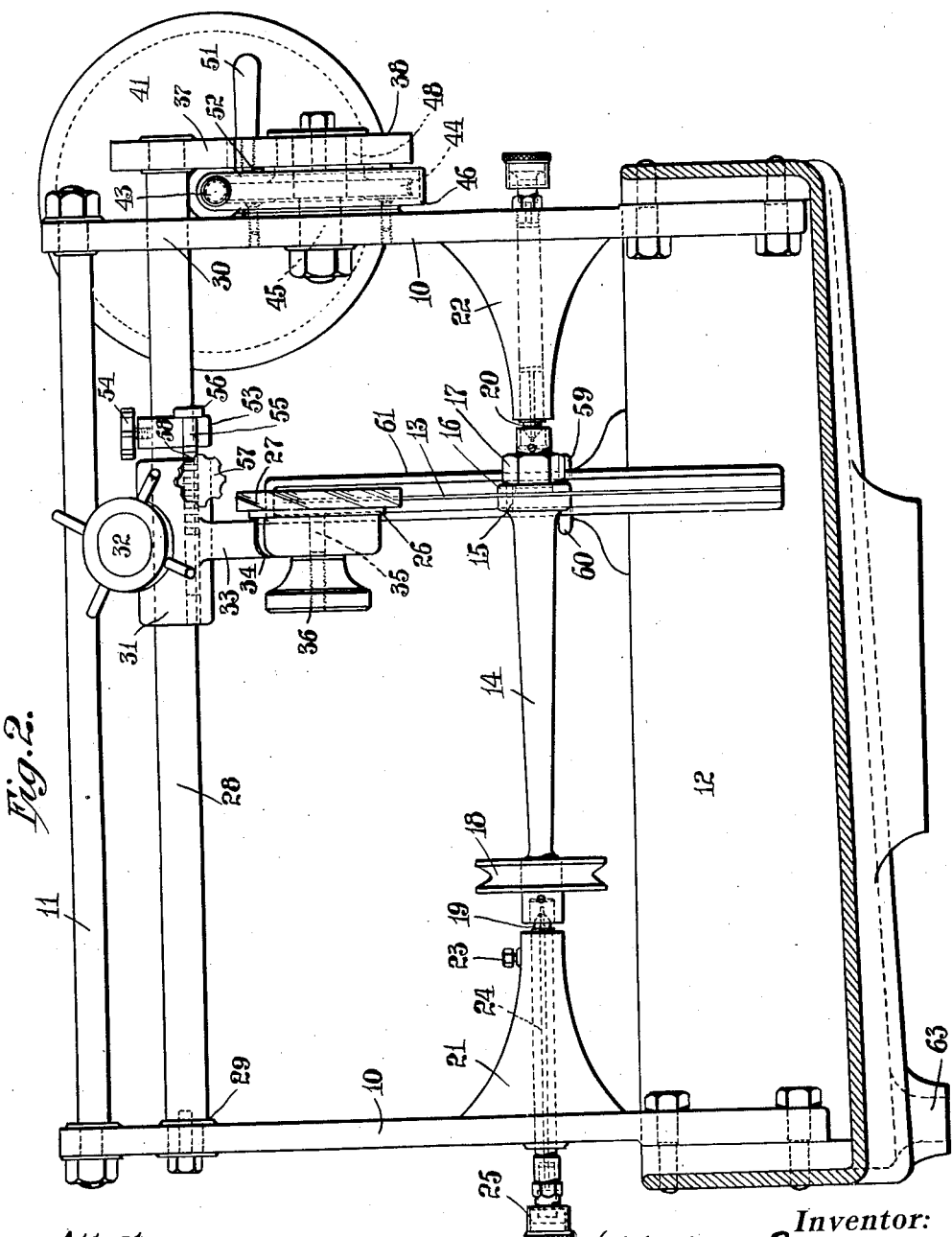

WILLIAM TAYLOR, OF LEICESTER, ENGLAND.

APPARATUS FOR SAWING GLASS.

1,385,731.  Specification of Letters Patent.  Patented July 26, 1921.

Application filed April 24, 1916. Serial No. 93,270.

*To all whom it may concern:*

Be it known that I, WILLIAM TAYLOR, a citizen of Great Britain, residing at Leicester, in the county of Leicestershire, England, have invented certain new and useful Improvements in Apparatus for Sawing Glass, fully described and represented in the following specification and the accompanying drawings, forming a part of the same.

This invention relates to apparatus for sawing glass, and particularly to apparatus of this class employed in lapidary work and for cutting optical glass in lens making. The present improvements are directed especially to means whereby the working life of the saw is prolonged and its efficiency of operation increased.

In cutting glass into plates or disks, as in the manufacture of lenses for example, it is customary to employ saws of different forms whose cutting portions are charged with an abrasive material, usually diamond particles, to enhance the cutting effect of the saw. A circular saw with its periphery thus charged is used for cutting flat slices of glass; while for cutting glass disks, a saw in the form of a tube charged at its cutting end with diamond is employed. Where saws of this character are used commercially for cutting glass in considerable quantities, it is a matter of great importance to secure a maximum output from the saw with a minimum use of diamond.

It is usual in sawing glass by means of circular saws to make the saw of a steel or iron known in the trade as "lapidary plate," to hack the periphery of the saw with a chisel, to place in the resulting cuts diamond dust, generally mixed with oil to form a paste, and then to roll or press the periphery of the saw so as to close the cuts and thus entrap the diamond dust. I have found that the durability of such a saw and the length of its working life depend very largely upon the rate at which the work is fed to the saw; and that for high durability and long working life it is very essential that the saw never be overloaded. If it be overloaded, the metal holding the diamond dust or particles in the periphery of the saw becomes overstrained or else is quickly worn away by the excess of glass dust formed in too rapid cutting. In either case the diamond material is thereby released and wasted. It is very desirable, however, especially from the standpoint of output and efficiency, to work the saw at a rate closely approaching but somewhat short of the overload point; and one of the principal objects of this invention is to provide apparatus for sawing glass in which provision is made for insuring high efficiency of saw operation while guarding against and preventing overloading of the saw.

Described in general terms, the invention consists in a glass-sawing machine construction in which means are provided for feeding or presenting the work, such as a block or slab of glass, to the saw, such means being constantly impelled toward the saw in any suitable way, as by gravity, for example; and in providing further means to limit or regulate in a predetermined manner the action of such feeding means, whereby too rapid feeding of the work to the saw is prevented and the attendant danger of overloading the saw is avoided.

Other features of the invention will appear hereinafter in the detailed description of a typical form of apparatus within the invention.

While the improvements herein disclosed are applicable, as stated, to glass cutting saws of various forms, the specific apparatus here chosen as a concrete example to illustrate and explain the principles of the invention is a machine of the circular saw type. It is sufficiently clear, however, that the invention is not limited to saws of this description, and also that the broad principles of the invention may be embodied in other mechanical forms than the form herein selected for the purpose of illustration.

In the accompanying drawings:

Figure 1 is a view of the apparatus in side elevation;

Fig. 2 is a front elevation, partly in section;

Fig. 3 is a sectional detail showing the feed regulating cam with its frictional driving device and certain adjacent parts.

Referring to the drawings, the moving parts of the apparatus are shown as mounted on a suitable supporting framework consisting in this instance of two rearwardly inclined uprights 10 connected at their upper ends by a cross bar 11, and bolted or otherwise secured at their lower ends to a drip pan or tank 12 to be hereinafter more fully described. A circular saw 13 is mounted upon a revoluble spindle 14 to turn therewith, being here shown as keyed thereto at 15 and further held in position thereon by washer 16 and nut 17. While it is not to be inferred that the invention in its broader aspect is limited to saws having their cutting portions charged with abrasive as above described, nevertheless the invention is peculiarly adapted to machines employing such saws, and accordingly the saw here shown is of this type. However, since this type of saw, in and of itself, is well known in the art and therefore requires no further description, the saw is shown more or less conventionally or diagramm in the drawings.

The saw may be rotated at the proper speed by means of pulley 18 mounted on the spindle, which latter is mounted to turn on centers 19 and 20, carried by suitably apertured bosses 21 and 22, respectively on the machine frame. The center 20 may be fixed in boss 22 with a taper fit; but the center 19 fits in a hole of uniform diameter in boss 21, so that the center may be withdrawn (toward the left in Fig. 2) to facilitate removal and replacement of the spindle 14. A set screw 23 or the like is provided to secure the center 19 in the position illustrated. Each of the centers is provided with an axial bore or channel 24 through which grease may be supplied from lubricator 25, the grease working outwardly through the conical center bearings at the ends of the spindle and thus opposing the entrance of grit thereinto. The ends of the spindle 14 bearing against the centers may advantageously be bushed with hardened steel to prevent undue wear.

Means are provided for holding the piece of glass which is to be sliced or sawed and for feeding the same against the cutting edge of the saw. For this purpose a work holder of any suitable construction and mode of operation will serve. For example, such work holder may take the form of a vise; or it may be simply a holding plate 26, to which the block of glass 27 to be sliced is cemented. Provision is made for impelling the work toward the saw; and in the embodiment of my invention here shown, gravity is utilized for this purpose. To this end the work holder is arranged to swing in a vertical plane about a horizontal axis, located above the saw and to one side of the vertical plane passing through the saw axis, the work being forced toward the saw edge by its own weight plus that of the work holder and connected parts. In the construction shown in the drawings, a horizontal rock shaft 28 supported in bearings 29 and 30 in the uprights 10, carries adjustably fixed thereto by means of a boss or sleeve 31 and hand screw 32, a swinging work holder arm 33, which has an open slot 34 adapted to receive the threaded shank 35 of the holding plate 26, a hand nut 36 an the shank 35 serving for quickly clamping the holder in place. Work holders may thus be quickly removed and replaced, and loss of time in fastening pieces of glass to the holding plate is avoided. Since the rock shaft is free to turn, except as limited by mechanism to be described later, the slab of glass 27 normally presses against the saw edge and swings downwardly by gravity as the saw cuts its way therethrough. The combined weight of the work holder, glass and swinging arm is such as to provide sufficient force to feed the glass to the saw at all times; but in no case should it be great enough to crush the saw or damage the glass even though the saw should chance to be so blunt as to fail in cutting the glass. The location of the rock shaft bearings well above the saw prevents ready access of grit, etc., thereto.

In order to feed the glass to the saw at the optimum rate, while at the same time positively preventing overstrain of the saw periphery and dislodgment of the diamond dust or other abrasive material, provision is made, as before stated, to limit the rate at which the glass can advance toward the saw. Means operative to effect this result is shown in the present example as comprising a contact arm or lever 37 rigidly secured to the rock shaft 28 and arranged to bear upon the periphery of a rotatable cam 38 which is for the most part spiral in outline. In the position of the parts shown in Fig. 1, the lever 37 is resting on the peak of the cam and the glass is just clear of the edge of the saw. By turning the cam in the direction of the arrow the lever is allowed to descend gradually, which accordingly permits arm 33 and its attached work holder to swing downwardly and feed the glass to the saw. The total drop of the cam and the lengths of the arms or levers 33 and 37 are so arranged that the glass will be permitted to be moved from the periphery of the saw arbor, nearly to the flanges 39 of the saw arbor, after which, to prevent damage to the glass and the saw, the face of the cam is continued tangentially as at 40 so that further rotation of the cam in the direction indicated by the arrow operates to raise the lever 37 and thereby slightly lift the glass away from the saw. The movement of the cam in the said direction is limited by engagement of the arm 37 with the abrupt substantially radial shoulder in the periphery of the cam after a certain slight elevation of the lever 37. Mechanism is also provided for turning the cam at the proper rate of speed under given operating conditions and is here shown as comprising a driving pulley 41 taking power from any suitable source, not shown, and serving to drive worm shaft 42, which carries worm 43 meshing with worm wheel 44, said worm wheel being rotatably mounted on a stud 45 secured to the machine frame. The worm wheel may be inclosed in a casing 46 which is secured to the frame and which has an upper extension 47 affording supporting bearings for the worm shaft. The hub 48 of the worm wheel carries the cam 38, a frictional drive connection between the hub and the cam being afforded by a fiber block or pad 49 and thrust screw 50. Owing to the yielding character of the friction drive, the cam may be rotated manually by means of a handle 51 when, for example, it is desired to re-set the cam in starting position after a complete cut has been made. In order to prevent turning the cam so far by hand that the lever arm or cam-follower 37 might fall over the peak of the cam and the glass secured by the work holder thus fall against and damage the saw, a stop pin 52 is arranged on the outer face of wheel casing 46 in the path of the projecting inner end of handle 51, whereby the cam is arrested at the proper point in its return travel.

The speed at which the saw should be driven and the proper rate at which the glass should be allowed to feed toward the saw will of course vary with different kinds of glass and with other operating conditions. In a typical instance I have obtained excellent results when the saw was run at a peripheral speed of 750 feet per minute, and the controlling cam was rotated to permit the glass to feed to the saw at a rate of about one-half inch per minute. The driving connections for the saw and the controlling cam may be so arranged that the speeds of both may be varied together proportionately; while at the same time the speed of each is individually adjustable.

The work arm 33 is adjusted and set longitudinally of the rock shaft 28 to bring the piece of glass carried by the holder into proper position with relation to the saw according to the thickness of the slice to be cut, and is set radially of the shaft so that when the lever 37 is raised by the cam 38 the glass may be held slightly lifted from the saw; and the work arm is shifted longitudinally of the shaft for cutting successive slices from a piece of glass. In order to facilitate cutting successive slices of glass of one thickness, the rock shaft 28 is provided with a stop collar 53 which may be clamped in any adjusted position on the rock shaft by means of a clamping screw 54. An adjustable hook 55, which may conveniently take the form of a stud with a circular head 56 overhanging and engaging the outer face of the collar 53, is slidable in a way provided in the boss or sleeve 31 of the holder arm and may be clamped in any adjusted position by means of a screw 57, the hook being provided with a scale 58 graduated in tenths of an inch, for example, to gage the thickness of glass required. The hook 55 is set according to the desired thickness of the slices, and after a slice of glass has been cut, the collar 53 is moved to the right against the head of the hook and is clamped to the shaft 28 as shown, and the screw 32 is then released and the arm 33 moved until its boss or sleeve 31 abuts the collar 53, when it is again clamped to the shaft in position for sawing the next slice.

In the apparatus illustrated, a liquid lubricant, such as a water solution of soap containing soda, is supplied to the saw under pressure through pipes 59 and 60 which turn inwardly toward the saw in such manner as to project liquid against both sides of the saw, most desirably at a point somewhat near the center of the saw where the velocity is low; or the pipes may turn to discharge the solution in the direction in which the saw moves, whereby splashing is practically avoided. In either case, the centrifugal force spreads the liquid radially and floods the entire outer zone of the saw, the surplus liquid being thrown off at the saw periphery. In order to catch the greater part of the liquid thus thrown off, a casing or guard 61 is arranged to inclose the top and rear side of the saw, this casing also serving to support the pipes 59 and 60. This casing is here illustrated as removably clamped to the rim of pan 12 as at 62. The pan 12 serves to receive the liquid thrown off by the saw and its bottom is conveniently sloped to an outlet 63 from which the liquid may be conveyed to a settling tank or some other separating means (not shown) for separating grit, etc., after which the liquid may be pumped back through conduit 64 to the pipes 59 and 60 to be used over again.

The method of using the apparatus will be clear from the foregoing description of its construction. The piece of glass to be sawed having been cemented to the holder and the latter clamped to the swinging supporting arm 33, the controlling cam is manually turned, if necessary, until the parts are in the position illustrated in Fig. 1, and the arm 33 is adjusted longitudinally of the rock shaft for obtaining the proper slice thickness. Power being applied, the saw and feed-controlling cam rotate as indicated by their respective direction arrows, while the outer zone of the saw is thoroughly lubricated and flushed on both sides by the streams of liquid from pipes 59 and 60. The glass feeds to the saw by gravity, but the rate of feed is positively regulated and controlled by the restraining action of the cam whose speed of rotation should be adjusted to permit the glass to feed forward at a rate previously determined to be somewhat short of that which would overload the saw. When the cut is completed, the cam is manually turned back to starting position, the arm 33 is advanced along the rock shaft a distance equal to the proper slice thickness, and the cutting operation proceeds as with the first slice. This cycle of operations may be repeated as long as the block of glass lasts, whereupon the work holder may be readily unclamped from arm 33 and replaced by another holder and piece of glass which latter is then cut up in the manner described above.

What is claimed is:

1. Apparatus for sawing glass, which comprises in combination a saw, a work holder for supporting the glass to be sawed, means by which one of said members tends to move to cause a relative approaching movement between the glass and the saw with a force sufficient to effect the approaching movement at the desired rate when the saw is in proper working condition but not sufficient to damage the saw or the glass when the saw is blunt, and means for limiting such approaching movement to a predetermined rate slightly less than that which would normally overload the saw.

2. Apparatus for sawing glass, which comprises in combination a saw, a work holder for supporting the glass to be sawed, means acting through one of said parts to cause a relative approaching movement between the glass and the saw with a force sufficient to effect the approaching movement at the desired rate when the saw is in proper working condition but not sufficient to damage the saw or the glass when the saw is blunt, and mechanically driven means for limiting such approaching movement to a predetermined rate slightly less than that which would normally overload the saw.

3. Apparatus for sawing glass, which comprises in combination a saw, a work holder for supporting the glass to be sawed, one of said members being constructed and arranged to tend to move under the action of gravity to cause a relative approaching movement between the glass and the saw with a force sufficient to effect the approaching movement at the desired rate when the saw is in proper working condition but not sufficient to damage the saw or the glass when the saw is blunt, and means for limiting the movement of the movable member to a predetermined rate slightly less than that which would normally overload the saw.

4. Apparatus for sawing glass, which comprises in combination a saw, a work holder for supporting the glass to be sawed, one of said members being constructed and arranged to move to cause a relative approaching movement between the glass and the saw with a force sufficient to effect the approaching movement at the desired rate when the saw is in proper working condition but not sufficient to damage the saw or the glass when the saw is blunt, and a cam device arranged to oppose such approaching movement while permitting such approaching movement to take place at a predetermined rate slightly less than that which would normally overload the saw.

5. Apparatus for sawing glass, which comprises in combination a saw, a work holder for supporting the glass to be sawed, means by which one of said members moves to cause a relative approaching movement between the glass and the saw, a cam device arranged to oppose such approaching movement while permitting such approaching movement to take place at a predetermined rate, and power operated means for operating the cam device, said power operated means including a yielding connection permitting manual movement of the cam device.

6. Apparatus for sawing glass, which comprises in combination a saw, a work holder for supporting the glass to be sawed, one of said members tending to move to cause a relative approaching movement between the glass and the saw, a cam for limiting such approaching movement, said cam being shaped to cause a slight separating movement between the glass and the saw after the approaching movement has been completed, and stop means to definitely limit the movement of said cam.

7. Apparatus for sawing glass, which comprises in combination a saw having a continuously moving cutting edge, a work holder for supporting the glass to be sawed, one of said members tending to move to cause a relative approaching movement between the glass and the saw, means for limiting such approaching movement to a predetermined rate, and means permitting a relative adjustment between the work holder and the saw to determine the thickness of glass to be cut.

8. Apparatus for sawing glass, which comprises in combination a saw, a work holder for supporting the glass to be sawed, one of said members tending to move to cause a relative approaching movement between the glass and the saw, means for limiting such approaching movement to a predetermined rate, means for adjusting one of the first two said members for cutting successive slices from the glass, and means for determining the thickness of the slices to be cut comprising an adjustable stop carried by the work holder and an abutment adjustable relatively to the work holder and limited in its movement by said stop and serving to limit the movement of the work holder.

9. Apparatus for sawing glass which comprises in combination a saw having its peripheral edge charged with abrasive material fixed therein, a work holder for supporting the glass to be sawed, means by which one of said members tends to move to cause a relative approaching movement between the glass and the saw with a force sufficient to effect the approaching movement at the desired rate when the saw is in proper working condition but not sufficient to damage a saw or the glass when the saw is blunt, and means for limiting such approaching movement to a predetermined rate slightly less than would normally overload the saw and release the abrasive material therefrom.

10. Apparatus for sawing glass, comprising in combination a saw, means adapted and arranged to press the glass against the saw with a force sufficient to feed the glass to the saw at the desired rate when the saw is in proper working condition but not sufficient to damage the saw or the glass when the saw is blunt, and means arranged to limit the feeding of the glass to a rate slightly less than that which would normally overload the saw.

11. Apparatus for sawing glass, comprising in combination a saw and driving means therefor, a movable work holder for supporting the glass, means to cause the glass to be pressed by the action of gravity downward against the saw with a force sufficient to feed the glass to the saw at the desired rate when the saw is in proper working condition but not sufficient to damage the saw or the glass when the saw is blunt, and means for limiting the feeding movement of the work holder to a rate slightly less than that which would normally overload the saw.

12. Apparatus for sawing glass, comprising in combination a saw and driving means therefor, a work holder for the glass comprising means arranged to move with the glass under the action of gravity to cause the glass to be pressed downward against the saw with a force sufficient to feed the glass to the saw at the desired rate when the saw is in proper working condition but not sufficient to damage the saw or the glass when the saw is blunt, a cam for restraining the feeding movement of the work-holder, and means for operating said cam to permit such feeding movement at a rate slightly less than that which would normally overload the saw.

13. Apparatus for sawing glass, comprising in combination a saw and driving means therefor, work-holding means constructed and arranged to feed the glass toward the saw with a force sufficient to feed the glass at the desired rate when the saw is in proper working condition but not sufficient to damage the saw or the glass when the saw is blunt, a cam device arranged to oppose the feeding movement of said work-holding means while permitting the feeding to take place at a rate slightly less than that which would normally overload the saw, and means for operating said cam device.

14. Apparatus for sawing glass, which comprises in combination a saw and driving means therefor, work-holding means tending to move to feed the glass toward the saw, a cam device arranged to oppose the feeding movement of said work-holding means while permitting feeding to take place at a predetermined rate, power operated means for operating said cam device, and means for adjusting said cam device manually in relation to said power operated means.

15. Apparatus for sawing glass, which comprises in combination a saw and driving means therefor, work-holding means tending to move to feed the glass toward the saw, a cam device arranged to oppose the feeding movement of said work-holding means while permitting feeding to take place at a predetermined rate, and power operated means for operating said cam device, said power operated means including a yielding connection permitting manual adjustment of said cam device.

16. Apparatus for sawing glass, which comprises in combination a saw and driving means therefor, work-holding means tending to move to feed the glass toward the saw, a cam device arranged to oppose the feeding movement of said work-holding means while permitting feeding to take place at a predetermined rate, means for operating said cam device, means for adjusting said cam device manually in relation to said operating means, and a stop for limiting such manual movement.

17. Apparatus for sawing glass, which comprises in combination a saw, a work holder for supporting the glass to be sawed and comprising means to carry the glass toward the saw with a force sufficient to feed the glass to the saw at the desired rate when the saw is in proper working condition but not sufficient to damage the saw or the glass when the saw is blunt, a cam for opposing such feeding movement, and means for rotating said cam to permit the rate of such feeding movement to equal but not to exceed a predetermined rate slightly less than that which would normally overload the saw.

18. Apparatus for sawing glass, which comprises in combination a saw, a work holder for supporting the glass to be sawed, an arm carrying said work holder and pivotally supported to permit the work holder to move under the action of gravity to carry the glass downwardly toward the saw, and means for positively limiting the movement of the holder to a predetermined rate.

19. Apparatus for sawing glass, which comprises in combination a power-driven saw having a continuously moving cutting edge, a rock shaft, a work holder secured to the rock shaft and arranged to feed the glass by gravity to the saw, a cam follower secured to said rock shaft, and a cam against which said follower bears, said cam being operable to limit the feeding movement of said work-holding means.

20. Apparatus for sawing glass, which comprises in combination a saw, a rock shaft, a work holder for supporting the glass to be sawed, an arm extending from the rock shaft and carrying said work holder and arranged to feed the work to the saw by gravity, said arm being adjustable on the shaft longitudinally thereof, and a cam engaging a part carried by the rock shaft to oppose the rocking movement of the shaft and thereby limit the rate of movement of the work holder toward the saw.

21. Apparatus for sawing glass, which comprises in combination a power-driven saw having a continuously moving cutting edge, work-holding means adapted to feed the glass to the saw, a rotatable cam adapted to oppose such feeding, means for rotating said cam to permit controlled feeding to occur, the cam being so shaped as to move the glass somewhat away from the saw after it has been moved to a predetermined extent, and means positively limiting the rotation of said cam.

22. Apparatus for sawing glass, which comprises in combination a saw and driving means therefor, movable work-holding means constructed and arranged to feed the glass toward the saw with a force sufficient to effect the feeding of the glass toward the saw at the desired rate when the saw is in proper working condition but not sufficient to damage the saw or glass when the saw is blunt, a cam device arranged to oppose the feeding action of said work-holding means while permitting feeding to take place at a predetermined rate slightly less than that which would normally overload the saw, means for operating said cam device, said cam device being arranged to reverse the direction of feed after a predetermined feeding movement has been made, and means for positively stopping the cam at a predetermined point.

23. Apparatus for sawing glass, which comprises in combination a saw having a continuously moving cutting edge, a work-holder for supporting the glass to be sawed, one of said members tending to move to cause a relative approaching movement of the glass and the saw, means for limiting such approaching movement to a predetermined rate, and means for permitting a relative adjustment between the work holder and the saw to vary the thickness of the glass to be cut and including gage means for determining this thickness and providing an abutment against which said work-holding means may be moved into proper cutting position.

24. Apparatus for sawing glass, which comprises in combination a pivoted work-holding arm provided with a slot open at one side, a work-holder having a shank adapted to enter said slot laterally, and clamping means coöperating with said shank to clamp said work-holder removably to said arm.

25. Apparatus for sawing glass, which comprises in combination with a saw having its cutting edge charged with abrasive material fixed therein, a work holder for supporting the glass to be sawed, means by which one of said members tends to move to cause a relative approaching movement between the glass and the saw, and means for positively limiting the movement of the glass to a predetermined rate to prevent overloading of the saw and resulting release of the abrasive material therefrom.

26. Apparatus for sawing glass, which comprises in combination with a power-driven saw having a continuously moving cutting edge charged with abrasive material fixed therein, work-holding means pivotally mounted and arranged to swing by gravity toward the saw and thereby to feed the glass thereto, and means for positively limiting such swinging movement to a predetermined rate to prevent overloading of the saw and resulting release of the abrasive material therefrom.

27. Apparatus for sawing glass, which comprises in combination with a power-driven saw having a continuously moving cutting edge charged with abrasive material fixed therein, work-holding means pivotally mounted in bearings located above the saw and arranged to swing by gravity toward the saw and thereby to feed the glass thereto, and means for positively limiting such swinging movement to a predetermined rate to prevent overloading of the saw and resulting release of the abrasive material therefrom.

28. Apparatus for sawing, comprising in combination a saw having a continuously moving cutting edge, means for supporting the glass to be cut, means for applying to one of said members a constant predetermined force tending to cause the saw to pass through the glass, and means for limiting the movement of the saw through the glass to a predetermined rate greater than the rate at which said force will drive the saw through the work when the saw is dull and less than the rate at which said force would drive the saw through the work when the saw is sharp, whereby the rate of movement of the saw through the work is determined by said constant force when the saw is dull and is determined by said limiting means when the saw is sharp.

29. Apparatus for sawing, comprising in combination a saw, means for supporting the glass to be cut, means for applying to one of said members a predetermined force tending to cause the saw to move through the glass, a check upon the member to which this force is applied, and positively driven means receding at a constant predetermined rate to limit the movement of the saw through the glass to a predetermined rate by contacting with said check when the cutting surface of the saw is in such condition that said force tends to drive it through the glass at a rate of movement greater than that of said limiting means.

30. Apparatus for cutting glass and the like, comprising a cutting tool having its cutting edge charged with abrasive material fixed therein, and means for causing a relative feeding movement between the tool and the work including means for mechanically limiting the maximum pressure between the cutter and the work and the maximum rate of feed to predetermined values.

31. Apparatus for sawing glass, which comprises in combination a saw having a continuously moving cutting edge, a work holder for supporting the glass to be sawed, means by which one of said members tends to move to cause a relative continuous approaching movement between the glass and the saw with a force sufficient to effect the approaching movement at the desired rate when the saw is in proper working condition, but not sufficient to damage the saw or the glass when the saw is blunt, and means for limiting such approaching movement to a predetermined rate slightly less than that which would normally overload the saw.

32. Apparatus for sawing glass, which comprises in combination a saw having a continuously moving cutting edge charged with abrasive material fixed therein, a work holder for supporting the glass to be sawed, means by which one of said members tends to move to cause a relative approaching movement between the glass and the saw with a force sufficient to effect the approaching movement at the desired rate when the saw is in proper working condition but not sufficient to damage the saw or the glass when the saw is blunt, and means for limiting such approaching movement to a predetermined rate slightly less than that which would normally overload the saw and release abrasive material therefrom.

33. Apparatus for sawing glass, which comprises in combination a saw having a continuously moving cutting edge, a work holder for supporting the glass to be sawed, one of said members being constructed and arranged to tend to move under the action of gravity to cause a relative approaching movement between the glass and the saw with a force sufficient to effect the approaching movement at the desired rate when the saw is in proper working condition but not sufficient to damage the saw or the glass when the saw is blunt, and means for limiting the movement of the movable member to a predetermined rate slightly less than that which would normally overload the saw.

34. Apparatus for sawing glass, which comprises in combination a saw having a continuously moving cutting edge, a work holder for supporting the glass to be sawed, means by which one of said members tends to move to cause a relative approaching movement between the glass and the saw with a force sufficient to effect the approaching movement at the desired rate when the saw is in proper working condition, but not sufficient to damage the saw or the glass when the saw is blunt, means for limiting such approaching movement to a predetermined rate slightly less than that which would normally overload the saw, means for arresting said approaching movement, and means for thereafter causing a separation of the saw and the work.

35. Apparatus for sawing glass, which comprises in combination a saw, a work holder for supporting the glass to be sawed, an arm carrying said work holder and pivotally supported to permit the work holder to move under the action of a predetermined force to carry the glass toward the saw, and means for limiting the movement of the holder to a predetermined rate.

36. Apparatus for sawing glass, which comprises in combination a saw, a rock shaft, a work holder secured to the rock shaft and arranged to feed the glass to the saw, and a cam and cam follower operable to limit the rate of the feeding movement of said work-holding means.

37. Apparatus for sawing glass, which comprises in combination a saw, a rock shaft, a work holder for supporting the glass to be sawed, an arm extending from the rock shaft and carrying said work holder and arranged to feed the work to the saw, said arm being adjustable on the shaft longitudinally thereof, and a cam arranged to oppose the rocking movement of the shaft and thereby limit the rate of movement of the work holder toward the saw.

38. In a machine for sawing glass, the combination of a saw, a work holder arranged to move toward the saw by gravity, means thereon for carrying the work, said work holder and means being constructed and arranged so that the feeding pressure of the work varies in accordance with the weight of the work, a cam opposing movement of the work holder and definitely regulating the feed, and stop means for stopping the feed movement of the cam upon the completion of one traversing movement of the work in relation to the saw.

39. In a machine for sawing glass, the combination of a saw, a work holder arranged to move toward the saw by gravity, means thereon for carrying the work, said work holder and means being constructed and arranged so that the feeding pressure of the work varies in accordance with the weight of the work, a cam opposing movement of the work holder and definitely regulating the feed, driving means for the cam, and a yieldable connection between the driving means and the cam to permit the position of the cam to be adjusted in relation to the driving means.

40. In a machine for sawing glass, the combination of a saw, a work holder pivotally mounted to swing toward the saw by gravity, means for attaching a piece of glass to the work holder, a cam engaging the work holder to regulate the feed, said cam having a spiral surface including a part arranged to lift the work holder near the end of its feed stroke, and means for driving the cam.

41. In a machine for sawing glass, the combination of a saw, a work holder pivotally mounted to swing toward the saw by gravity, means for attaching a piece of glass to the work holder, a cam engaging the work holder to regulate the feed, said cam having a spiral surface including a part arranged to lift the work holder near the end of its feed stroke, the cam also having a shoulder arranged to engage a part of the work holder to limit the feed movement of the cam, and means for driving the cam.

42. In a machine for sawing glass, the combination of a saw, a work holder pivotally mounted to swing toward the saw by gravity, means for attaching a piece of glass to the work holder, a cam engaging the work holder to regulate the feed, said cam having a spiral surface including a part arranged to lift the work holder near the end of its feed stroke, means for driving the cam, and a frictional connection between said driving means and the cam.

43. In a machine for sawing glass, the combination of a saw, a work holder pivotally mounted to swing toward the saw by gravity, means for attaching a piece of glass to the work holder, a cam engaging the work holder to regulate the feed, said cam having a spiral surface including a part arranged to lift the work holder near the end of its feed stroke, the cam also having a shoulder arranged to engage a part of the work holder to limit the feed movement of the cam, means for driving the cam, and a frictional connection between said driving means and the cam.

In testimony whereof I have hereunto set my hand in the presence of two subscribing witnesses.

WILLIAM TAYLOR.

Witnesses:
A. PIERCE,
P. CHAWNER.